United States Patent
Rao et al.

(10) Patent No.: US 7,243,013 B2
(45) Date of Patent: Jul. 10, 2007

(54) VEHICLE RADAR-BASED SIDE IMPACT ASSESSMENT METHOD

(75) Inventors: Manoharprasad K. Rao, Novi, MI (US); Kwaku O. Prakah-Asante, Commerce Township, MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 574 days.

(21) Appl. No.: 10/293,147

(22) Filed: Nov. 13, 2002

(65) Prior Publication Data

US 2004/0093141 A1   May 13, 2004

(51) Int. Cl.
*B60R 21/01* (2006.01)
*G08G 1/16* (2006.01)

(52) U.S. Cl. .................. 701/45; 701/301; 340/436; 280/734; 280/735; 180/274

(58) Field of Classification Search ............ 701/45–47, 701/36, 300–302; 280/728.1, 730.2, 734, 280/735; 180/268, 274, 282; 382/106; 340/425.5, 340/436
See application file for complete search history.

(56) References Cited

U.S. PATENT DOCUMENTS

| | | | |
|---|---|---|---|
| 5,467,072 A | 11/1995 | Michael | |
| 5,767,793 A | 6/1998 | Agravante et al. | |
| 5,806,019 A | 9/1998 | Ishiyama | |
| 5,940,011 A | 8/1999 | Agravante et al. | |
| 6,012,008 A | 1/2000 | Scully | |
| 6,025,796 A | 2/2000 | Crosby, II | |
| 6,025,797 A | 2/2000 | Kawai et al. | |
| 6,087,928 A | 7/2000 | Kleinberg et al. | |
| 6,209,909 B1 | 4/2001 | Breed | |
| 6,243,632 B1 | 6/2001 | Jung | |
| 6,295,495 B1 | 9/2001 | Morman et al. | |
| 6,307,622 B1 | 10/2001 | Lewis | |
| 6,343,810 B1 | 2/2002 | Breed | |
| 6,624,782 B2 * | 9/2003 | Jocoy et al. .................. 342/70 |
| 2003/0076981 A1 * | 4/2003 | Smith et al. ................. 382/104 |

FOREIGN PATENT DOCUMENTS

| | | |
|---|---|---|
| EP | 0 699 924 B1 | 3/1996 |
| JP | 195699 | 7/2001 |
| WO | WO 98/15435 | 4/1998 |

* cited by examiner

*Primary Examiner*—Y. Beaulieu
(74) *Attorney, Agent, or Firm*—Frank MacKenzie; Artz & Artz, P.C.

(57) ABSTRACT

A side impact object sensing system for a vehicle includes a single radar sensor mounted on each side of the vehicle, each sensor generating a range and range-rate value for a detected target object, and a controller coupled to each radar sensor. The controller calculates an estimated target object speed, an angle of the target object line of travel with respect to the respective sensor line of sight, and a shortest distance value from the respective sensor to the target object line of travel, and compares the shortest distance value and a change in the angle value to respective threshold values for potential collision threat assessment.

20 Claims, 7 Drawing Sheets

VEHICLE RADAR-BASED SIDE IMPACT ASSESSMENT METHOD

TECHNICAL FIELD

The present invention relates generally to object tracking systems for automotive vehicles, and more particularly to a pre-crash side impact threat assessment system for a vehicle using radar sensing.

BACKGROUND ART

Side impacts account for approximately one-third of all vehicle crashes. Generally, side impacts are potentially injurious to the vehicle occupants due to the close proximity of the occupants to the impacted structure. In addition to providing adequate side structural stiffness, automotive manufacturers employ side airbags, side curtains and other occupant protection systems to provide enhanced occupant protection. However, due to the close proximity of the occupants, these occupant protections systems have only a few milliseconds for full deployment before the side structure infringes upon the vehicle occupant compartment. The benefits of pre-crash sensing, which provides additional time for proper deployment of side occupant protection systems are well understood. The challenge is to provide reliable and affordable pre-crash sensing for side impact protection systems.

To meet wide-angle coverage requirements for pre-crash sensing purposes, multiple pulsed radar-based sensing systems are being investigated for automotive applications. Radar sensors with mechanically or electronically scanning antennas are also under consideration for accurately tracking objects in the field of view of the radar sensors on a real-time basis for reliable countermeasure activation and to minimize false alarms. Such radar sensor systems, however, are relatively expensive, and may not be viable for some vehicle platforms.

The need for more affordable radar-based collision avoidance systems has made it apparent that a new technique to minimize collision damage is needed. The new technique should accurately predict a target vehicle position with respect to a host vehicle, substantially minimize the time between an anticipated unavoidable collision detection and subsequent activation of safety devices, and be less expensive than mechanically scanning or electronically scanning radar-based collision sensing systems or systems with multiple radar sensors. The present invention is directed to these ends.

SUMMARY OF THE INVENTION

The present invention provides a method for remote, non-contact sensing based pre-crash side impact threat assessment using a single radar sensor per vehicle side, each with a wide field of view for target path prediction. Each radar sensor provides range and range-rate information. The measured data, and additional parameters estimated from the measured data provide inputs into a side impact assessment method to provide reliable and accurate pre-crash notification to the occupant protection system. The present invention also provides a radar-based pre-crash side impact threat assessment system for an automobile.

In one aspect of the invention, a side impact object sensing system for a vehicle is provided. The system includes a single radar sensor mounted on each side of the vehicle, each sensor generating a range and range-rate value for a detected target object, and a controller coupled to each radar sensor. The controller calculates an estimated target object speed, an angle of the target object line of travel with respect to the respective sensor line of sight, and a shortest distance value from the respective sensor to the target object line of travel, and compares the shortest distance value and a change in the angle value to respective threshold values. The system can also include a safety countermeasure device, wherein the controller activates the safety countermeasure device when the respective threshold values are satisfied.

In another aspect of the invention, a method of operating a vehicle side impact countermeasure system is provided. The method includes providing a single radar sensor on each side of a vehicle for generating a range and range-rate value for a respective detected target object, calculating an estimated target object speed, calculating an angle of the target object line of travel with respect to said respective sensor line of sight, calculating a shortest distance value from the respective sensor to the target object line of travel, comparing the shortest distance value and a change in the angle value to respective threshold values, and activating a safety countermeasure device when the respective threshold values are satisfied.

In another embodiment, the method also includes comparing the target object speed to a threshold detected object speed, comparing the target object range to a threshold detected object range, estimating a target object time-to-impact and comparing the target object time-to-impact to a threshold detected object time-to-impact, and activating a safety countermeasure device when the respective threshold values are satisfied.

Advantages of the current invention are that remote sensing range and range-rate information of a target object in the near vicinity of the host vehicle are used and threat assessment is made through a fast, robust and reliable algorithm. Fast algorithms allow more decision making time on the part of vehicle controllers and more deployment time for safety devices and are therefore preferable.

Additional advantages and features of the present invention will become apparent from the description that follows and may be realized by the instrumentalities and combinations particularly pointed out in the appended claims, taken in conjunction with the accompanying drawings.

DETAILED DESCRIPTION

The present invention is illustrated with respect to a pre-crash threat assessment and safety device activation system 1, particularly suited to the automotive field. The present invention is, however, applicable to various other uses that may require pre-crash threat assessment, as will be understood by one skilled in the art.

Figure 1:
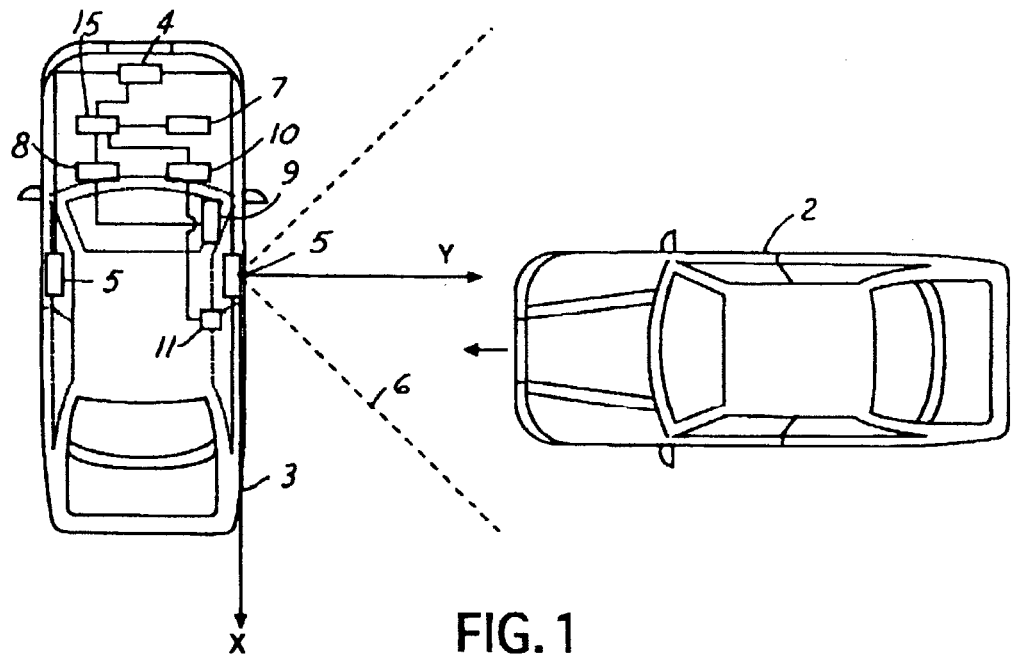
FIG. 1 is an example of a pre-crash assessment system in which the present invention may be used to advantage.

Referring to FIG. 1, a pre-crash assessment system 1, including a first target object (here illustrated as a first target vehicle 2) imminently colliding with a host object (here illustrated as a host vehicle 3), is illustrated. The first target object is an object, either in motion or stationary, that has a high potential for crash with the host vehicle 3. The high potential for crash is generally defined as an object on a collision path with the host vehicle 3. The host object is an object in motion or stationary, having at least one remote sensor. The pre-crash assessment system includes a radar system 4 coupled to the host vehicle 3. The system 4 detects vehicle states (dynamics) of the first target vehicle 2. Examples of vehicle states are range and range-rate. The system 4 ideally includes a single Doppler radar sensor 5 on each side of the vehicle 3, each having a wide field of view 6 appropriate for automotive pre-crash applications. Other status monitoring sensors 7, such as: a yaw rate sensor, a steering wheel angle measuring sensor, and a vehicle speed sensor, can also be coupled to the host vehicle 3. The status monitoring sensors 7 provide information on the present states of the host vehicle 3, which are subsequently used by the collision assessment system, as will be discussed below.

The first safety device actuator 8 is coupled to the host vehicle 3. This actuator 8 activates the first safety device 9, here embodied as side airbag system. The second safety device actuator 10 is also coupled to the host vehicle 3. The second safety device actuator 10 activates a second safety device 11, here embodied as a safety belt pretensioner. Numerous actuators and safety devices may be added to the system and are contemplated by the present invention. For example, side airbags for the front and rear passenger compartments, side curtain airbags, active head restraints, A, B and C-pillar airbags, seat belt pretensioning systems and all other side impact safety systems are contemplated for use with the present pre-crash side impact assessment method.

The safety device controller 15 is also coupled to the host vehicle 3. The remote sensing system obtains range and range-rate information for the target object, shown here as target vehicle 2, with respect to the radar sensor mounted at a selected location on the side of the host vehicle. From the above information, the safety device controller generates a tracking signal for the target vehicle 2, and also estimates object relative speed u, the angle θ made by the line of travel of the target vehicle with the line of sight joining the sensor to the target object and $d_s$ the shortest distance from the sensor to the line of travel of the target object, as explained later. The controller uses u, $d_s$, θ, range, range-rate, and estimated time-to-impact for potential collision threat assessment as detailed later.

Potential collision threat assessment is used to activate safety countermeasures for enhanced occupant protection. Each individual safety device has a substantially unique time requirement to become fully effective, and the decision to activate a particular safety device takes this unique time requirement into consideration. For example, the activation decision time for pyrotechnic seat belt pretensioners may be different than for pre-arming airbags due to differences in deployment times.

The safety device controller 15 further sends control signals to the host vehicle Controller Area Network Bus (CAN), which controls the first safety device actuator 8 and the second safety device actuator 10 based on threat assessment evaluations, as will be understood by one skilled in the art. The controller 15 is, for example, a microprocessor-based controller coupled to a memory and a timer which may be separate components or which may be incorporated into controller 15. The memory may comprise various types of memory including read-only memory, random access memory, electrically erasable programmable read-only memory, and keep-alive memory. Memory is used to store various thresholds and parameters as will be discussed below. The timer is a timer such as a clock timer of a central processing unit within the controller 15. The timer is capable of timing the duration of various events as well as counting up or counting down. One embodiment of the controller 15 will be discussed in detail below with reference to FIG. 2.

Figure 2:
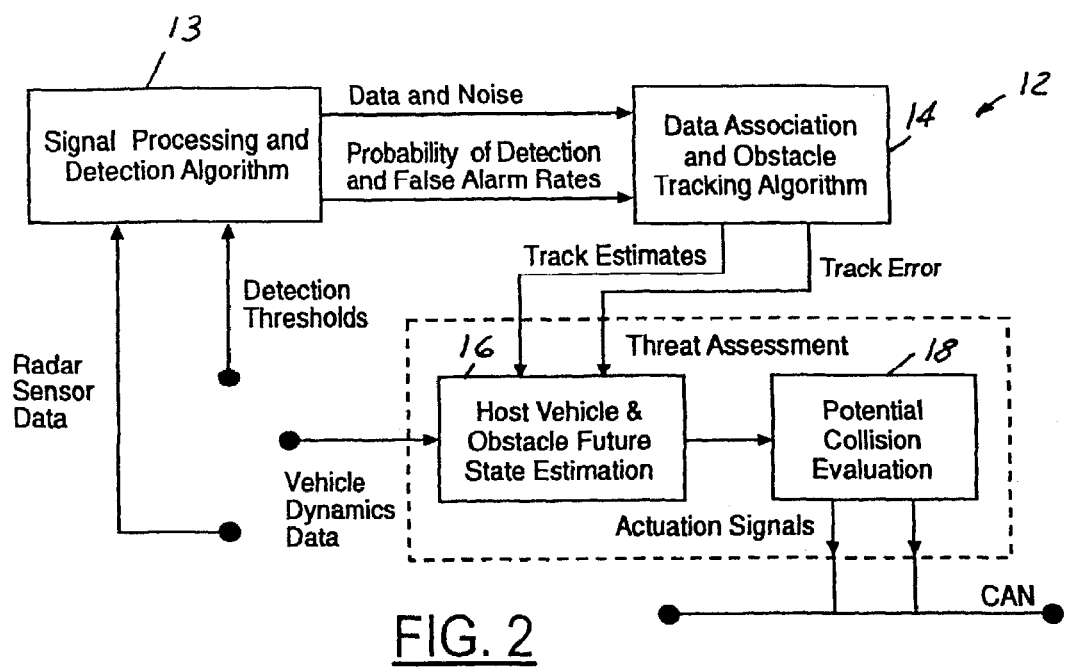
FIG. 2 is a block diagram of a remote sensing based pre-crash side impact assessment system in accordance with one embodiment of the present invention.

Referring to FIG. 2, a block diagram of a remote sensing based pre-crash threat assessment system 12, is illustrated. The current invention addresses only threat assessment aspects of the system 12 (for pre-crash sensing purposes) with a radar-based remote sensing system.

The system 12 starts when operation block 13, which engages signal processing and detection algorithms, receives radar sensor data and predetermined detection thresholds. The radar sensor data is generated when an object impedes the radar pulse and reflects the pulse back to the radar sensor on the host vehicle. The radar system comprises a single Doppler radar on each side of the vehicle with a wide field of view appropriate for automotive pre-crash applications. For example, each sensor comprises a non-scanning antenna, wide-angle, single pulsed Doppler radar sensor with range and range-rate capabilities. The detection thresholds are pre-set based on acceptable probability of detection and false alarm rates. Subsequently, operation block 13 sends the data and noise accompanying the signal, as will be understood by one skilled in the art, to operation block 14. The probability of detection and false alarm rates have significant effects on items such as track initiation and track quality.

Operation block 14 associates the data from operation block 13 and engages an obstacle-tracking algorithm. Operation block 14 then sends the track estimates of the object, which is on a potential collision course with the host vehicle, and further sends the tracking error estimate signals to operation block 16, as will be understood by one skilled in the art. Host vehicle dynamic data, from the host vehicle dynamic sensing systems, is also sent to the operating block 16.

Using this combination of received data, operation block 16 estimates target object relative speed u, the angle θ made by the line of travel of the target vehicle with the line of sight joining the sensor to the target object and $d_s$ the shortest distance from the sensor to the line of travel of the target object and sends this data to operation block 18. An evaluation is then made in operation block 18 of the potential for collision of the host vehicle and the target vehicle. Operation blocks 16 and 18 are the threat assessment components of the system 12, which will be discussed in detail later. Subsequently, operation block 18 sends actuation signals to the Controller Area Network Bus (CAN) of the host vehicle, which engages the safety devices (countermeasures), as will be understood by one skilled in the art.

The detection and tracking method disclosed herein can be used for front, side and rear automotive pre-crash sensing applications. The detection and tracking method and system can also be used for collision warning, collision avoidance and sensor fusion.

This invention is especially suitable for, though not limited to, applications, which require relatively shorter countermeasure deployment times, such as: pyrotechnic belt pre-tensioners, and certain countermeasures under consideration for side collisions such as side airbags and side curtains. The current invention uses a host vehicle mounted radar sensing system, with a wide field of view. The field of view is typically on the order of 20-30 m and is approximately 60 degrees wide. The invention further uses host vehicle status monitoring sensors and remote sensors to accurately predict the future states of both the host vehicle and the target vehicle and to assess future collision probabilities. These estimated collision probabilities are used with application specific countermeasure deployment logic to activate appropriate countermeasures, for accident damage mitigation.

Figure 3:
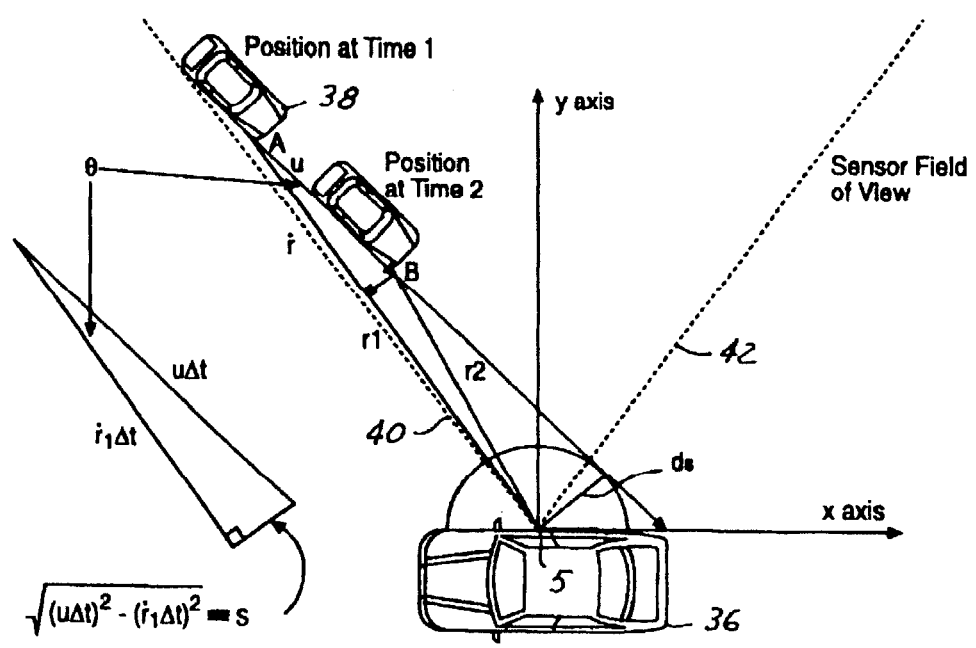
FIG. 3 is an illustration of a target detection scenario with the host vehicle stationary in accordance with an embodiment of the present invention.

The embodied approach is further clarified in FIG. 3 which illustrates an example of a pre-crash scenario with the host vehicle 36 stationary and the target object 38 such as a vehicle traveling in a straight line. The target vehicle 38 is being tracked with the single remote radar sensor 5, which is mounted on the side of the host vehicle 36. The radar sensor measures range and range-rate. Multiple target vehicles can be tracked, but only one target vehicle 38 is shown to illustrate the present method.

With the present configuration, the system preferably provides approximately 40 ms, and at least 20 ms, of advanced notice for countermeasure activation before the side of the host vehicle is impacted in a predefined zone by a target object traveling toward the host vehicle.

In FIG. 3, the target vehicle 38 is moving in a straight line with constant velocity (u), in the host vehicle sensor's field of view which extends between reference numerals 40 and 42. The nearest scattering center of the target object 38 is shown as a small circle at position A (at time $t_1$) and position B (at time $t_2$). The radar measurements of the target vehicle 38 are given by:

$r_1$ and $\dot{r}_1$=Range and Range Rate, when the object is at position A $r_2$ and $\dot{r}_2$=Range and Range Rate, when the object is at position B The radar sensor provides the target vehicle range and range-rate. The symbol ($d_s$) represents the shortest distance from the sensor to the line of travel of the target object. The zone defined by a predetermined value of $d_s$ represents the countermeasure activation area, if the other criteria are satisfied. In the example of FIG. 3, the radar sensor is mounted near the center on the side of the host vehicle. The sensor field of view 40, 42 is centered about the Y-axis of the XY coordinate system and, in this example, is approximately 60° wide. The XY coordinate system is located with its origin at the radar sensor mounted on the side of the host vehicle 36. The X-axis is aligned with the length of the vehicle, pointing towards the back of the vehicle. This XY coordinate system moves along with the host vehicle 36. In FIG. 3, the host vehicle 36 is shown as stationary. If the host vehicle is moving at a velocity (V), then u is considered as the relative speed with respect to the host vehicle.

The character (θ) represents the angle made by the line of travel of the target 38 with the line of sight of the sensor wherein the line of sight is the line joining the sensor to the target. The target speed is represented as (u) and (Δt) represents the time interval between measurements when the target vehicle is at positions A and B.

Thus, from FIG. 3, it can be seen that:

$$u = \frac{\sqrt{r_2^2 - r_1^2 + 2r_1|\dot{r}_1|\Delta t}}{\Delta t} \quad (1)$$

$$\theta = \cos^{-1}(\dot{r}_1/u) \quad (2)$$

$$d_s = r_1 \sin(\theta) \quad (3)$$

$$ETA = \sqrt{r_1^2 - d_s^2}/u \quad (4)$$

Using equations one through three, the target speed u, the angle θ and the distance $d_s$ can be calculated. Using equation four we can also predict the Estimated Time of Arrival (ETA), the time when the target vehicle will reach the closest approach point.

Figure 4:
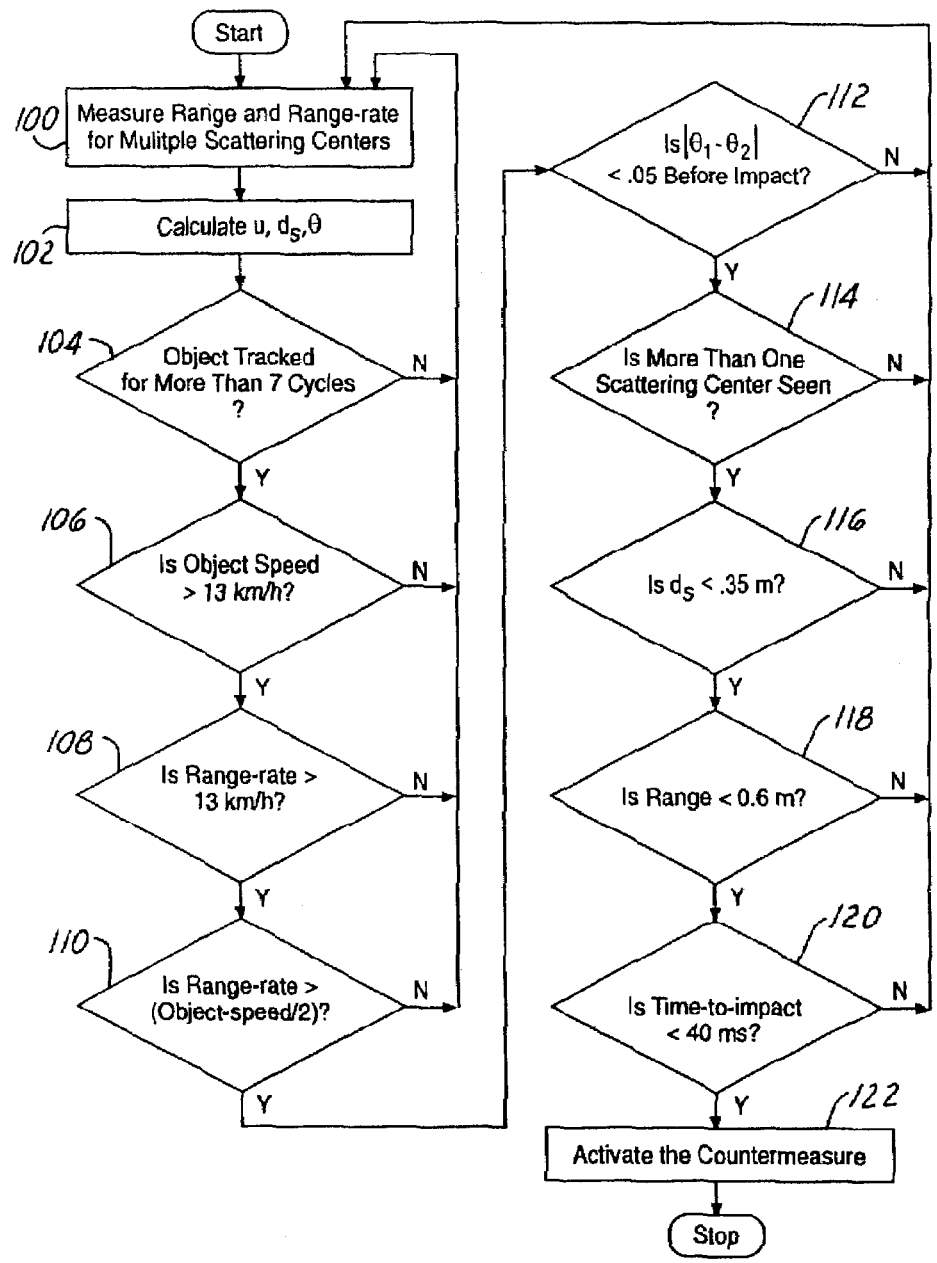
FIG. 4 is a logic flow diagram of a pre-crash side impact threat assessment method in accordance with an embodiment of the present invention.

Referring now to FIG. 4, there is shown a logic flow diagram of one method of remote sensing based automotive pre-crash side impact assessment according to the above described relationships. In block 100, the radar sensor of the host vehicle provides target range $r_1$ and range rate $\dot{r}_1$ at a particular time $t_1$ for multiple scattering centers for a detected object. From the target history, the target speed (u), angle (θ) and distance $d_s$ with respect to the radar sensor located on the host vehicle are determined in block 102 as explained above. Several target range and range-rate values are determined to create an object path history in block 104. With the target object trajectory information, a threat assessment can be made and countermeasures, if appropriate, can be deployed. For example, safety device specific threshold criteria in conjunction with safety device specific activation logic are used to tailor activation of suitable countermeasures as predicted future impact times can be readily determined from the target object trajectory information and host vehicle data. The future impact times correspond to the activation decision times of the individual safety devices. Thus, these impact times are compared to device-specific activation criteria. The threshold comparison, along with the safety device-specific activation criteria is used, by the controller, to send the signal to activate the safety device.

In this example, for the particular countermeasure under consideration, several assumptions are made. First, a threshold impact speed is defined, below which, pre-crash notification is not issued. In this example, the speed is 13 km/h, but could be any number of appropriate speeds at which pre-crash countermeasures are unnecessary or undesirable. The range ($d_s$) at which pre-crash notification is desired is defined as less than 0.35 m, and the time-to-impact is less than 40 ms. Again, this range value and time-to-impact value can be modified depending upon the desired behavior of the pre-crash countermeasure system.

Thus, in step 106, the object speed is compared to a threshold value for pre-crash arming. The range-rate of the object is also compared to a threshold value in step 108. This range-rate threshold value may be the same as, or different than, the object speed threshold value. In step 110, a determination is made whether the target object is traveling at a significant angle with respect to the host vehicle. Specifically, if the range-rate is greater than half of the object speed, the logic continues to step 112. The predicted relative change in angle (θ) is then examined in step 112. If the change in angle (θ) at impact and one time-step prior to impact is changing less than a threshold amount, it indicates a high probability that the target object line of travel is maintaining a course indicating a likely side impact with the host vehicle. Thus, the logic continues to step 114 wherein it is determined whether multiple scattering centers are detected for the target object which helps to reduce false activations due to single reflections generated by unintended objects like small metallic foils. The pre-defined zone of less than 0.35 m from the radar sensor is compared in step 116. Finally, if the detected object range and time-to-impact are within pre-defined limits set in steps 118 and 120, the corresponding countermeasure is activated in step 122. Of course, all of these steps need not be performed for adequate side impact assessment and the order of the steps can also be modified without departing from the spirit and scope of the present method.

Figure 5:
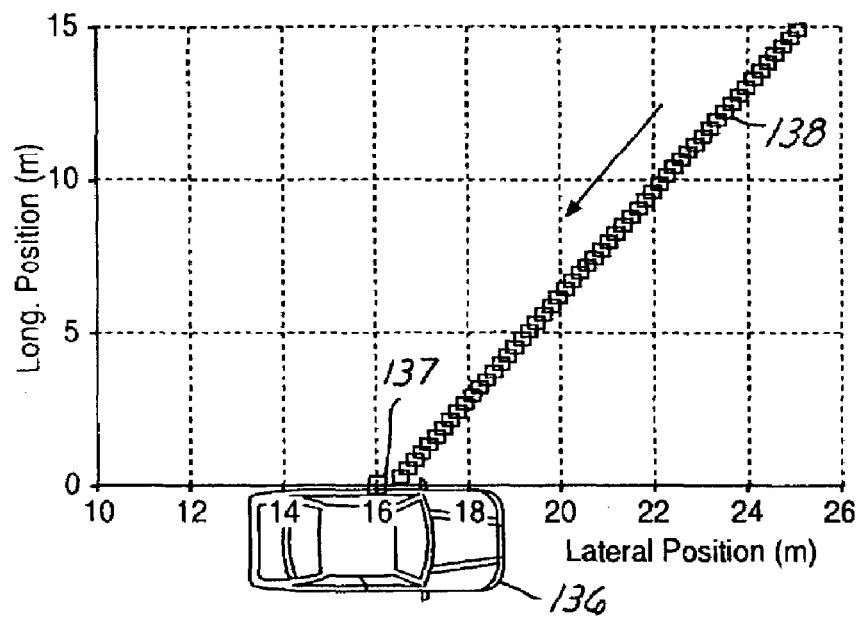
FIG. 5 shows an example of a pre-crash side impact scenario with host vehicle and target object traveling on a collision path.

Referring now to FIG. 5 there is shown one scenario of a pre-crash threat assessment wherein the present object tracking scheme is implemented. In FIG. 5, the radar sensor 137 on the host vehicle 136 is at (16 m, 0) with respect to the XY coordinate system shown and is stationary. The target object 138 is traveling at a speed of 56 km/h and is angularly approaching the side of the host vehicle from the left. The pre-defined zone is 0.35 m from the radar sensor.

Figure 6:
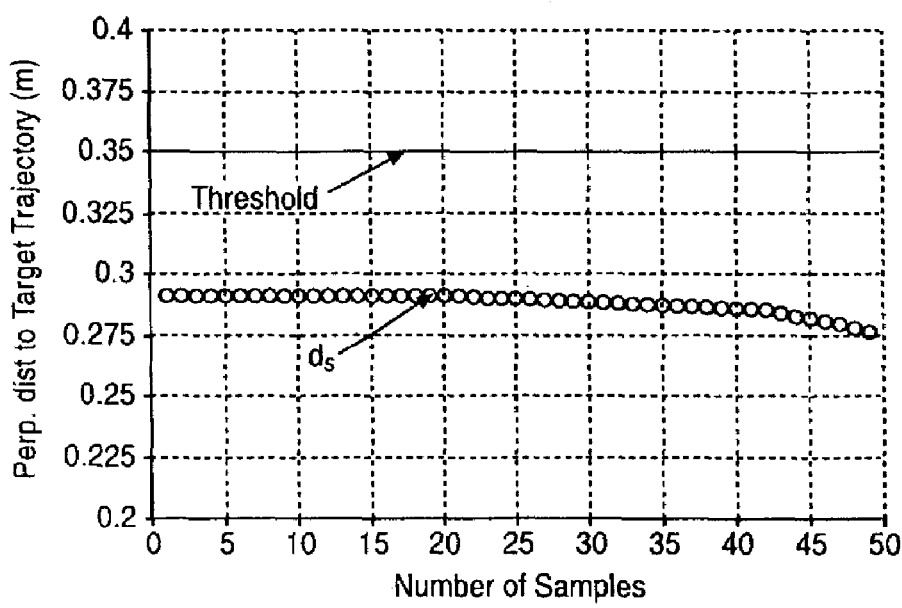
FIG. 6 is a graph of the estimated shortest distance to the target object for the example of FIG. 5 using the present method.
Figure 7:
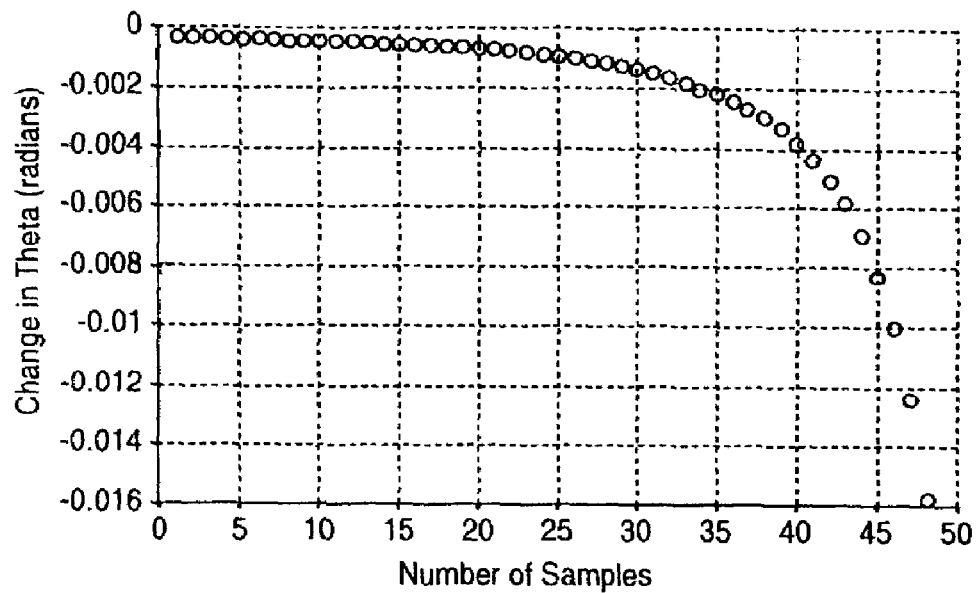
FIG. 7 is a graph of the estimated relative change in θ for the example of FIG. 5 using the present method.
Figure 8:
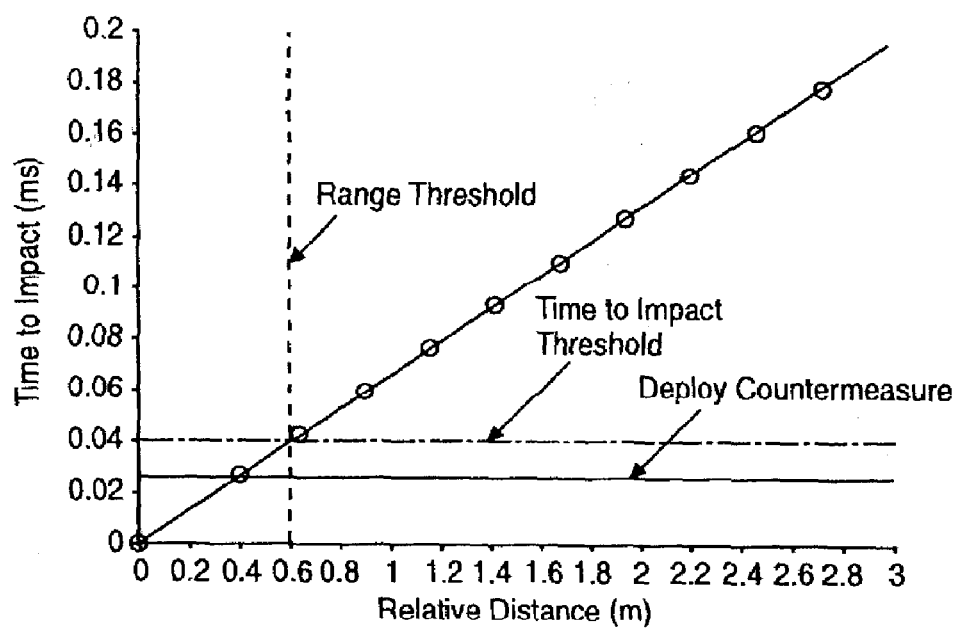
FIG. 8 is a graph of the estimated time-to-impact for the example of FIG. 5.

The results of an implementation of the above tracking scheme are represented in the graphs of FIGS. 6 through 8. As can be seen in FIG. 6, the estimated shortest distance ($d_s$) to the target vehicle 138 ranges from approximately 0.29 m to 0.275 m which corresponds closely with the scenario of FIG. 5 and is within the threshold zone of 0.35 m, thereby indicating a potential side impact event. FIG. 7 shows the predicted small relative change in θ (step 112) which indicates that the target object is on a likely impact path with the side of the host vehicle. FIG. 8 summarizes the predicted time-to-impact and countermeasure deployment status for the example of FIG. 5. As can be seen in FIG. 8, the range threshold is 0.6 m (step 118) and time-to-impact threshold is 40 ms (step 120). When both of these criteria have been satisfied, as well as the other criteria mentioned above, the countermeasure is deployed. In this example, deployment would occur at greater than 20 ms to impact.

Figure 9:
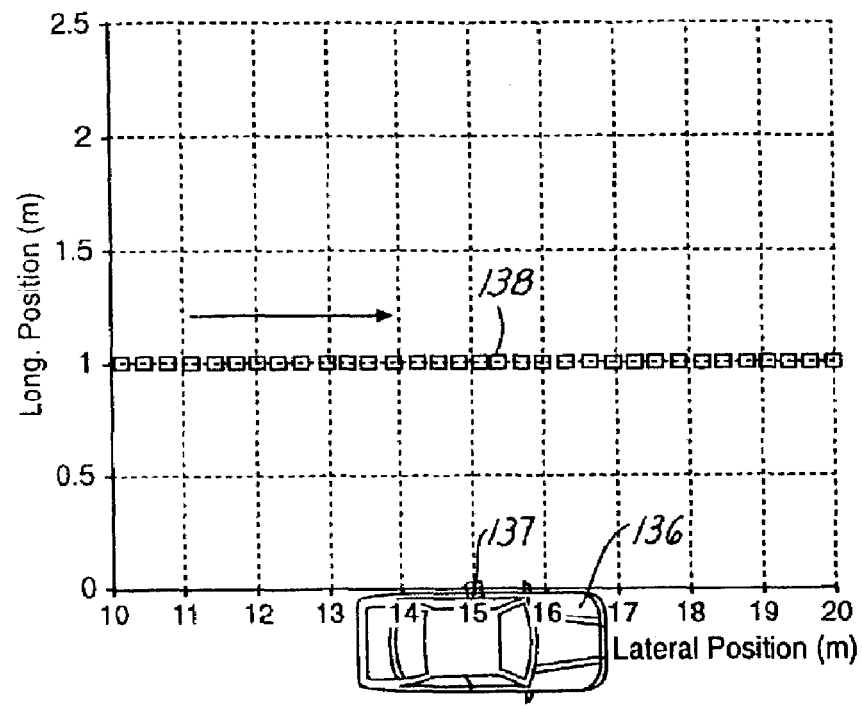
FIG. 9 shows an example of another pre-crash scenario with host vehicle and target object traveling parallel to each other.
Figure 10:
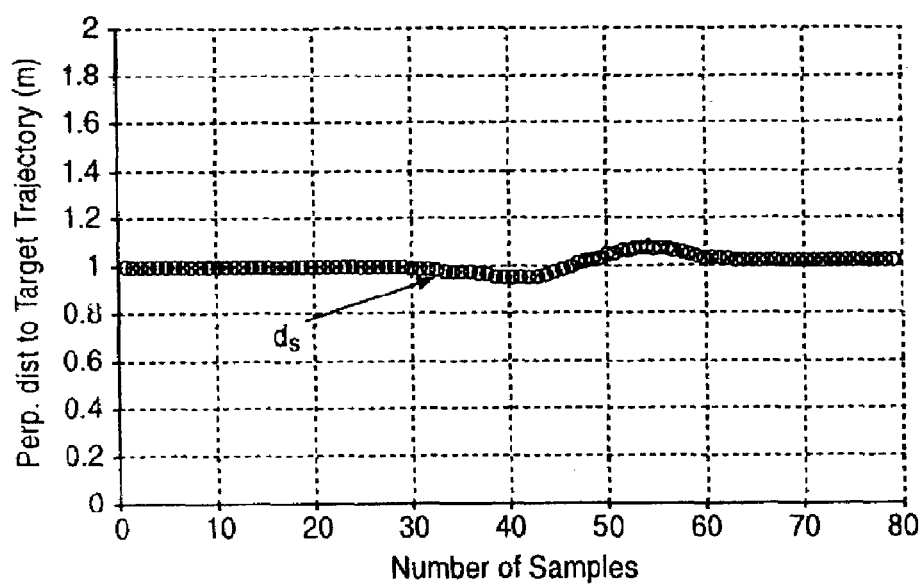
FIG. 10 is a graph of the estimated shortest distance $d_s$ to the target object for the example of FIG. 9 using the present method.
Figure 11:
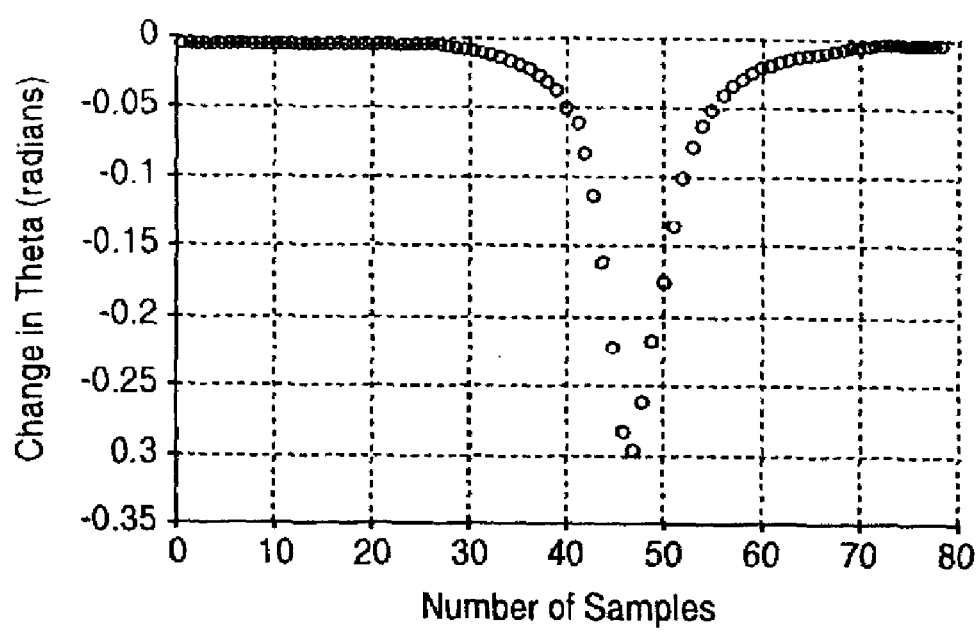
FIG. 11 is a graph of the estimated relative change in θ for the example of FIG. 9 using the present method.

FIGS. 9 through 11 show the results of a different scenario whereby the target vehicle 138 is traveling parallel to the host vehicle 136 at a speed of 56 km/h. FIG. 10 shows the predicted target object shortest distance ($d_s$) to the host vehicle radar sensor 137, which compares favorably (approximately 1 m) with the scenario of FIG. 9. Finally, FIG. 11 shows the characteristic direction of reversal of the change in θ as the target object crosses the radar sensor boresight at approximately the 47$^{th}$ data sample. Consequently, at least the predicted target object shortest distance to the host threshold (step 116) and range threshold (step 118) are not met. Thus, no countermeasures are activated.

The threshold values of the present invention can be modified as necessary to correspond to the countermeasure-specific activation time. Also, threshold values can be configured to mitigate the likelihood of false positives, i.e., activating the countermeasure when no side impact occurs. In general, the consequences of a false positive are more severe than a false negative. That is, deploying an airbag without an impact event may be more undesirable than failing to activate a countermeasure pre-impact as the original side impact protection system will still function upon the actual impact event. For example, in the case of a false negative, the side airbag will still deploy in response to contact sensor activation.

From the foregoing, it can be seen that there has been brought to the art a new non-contact vehicle sensing based pre-crash side impact threat assessment system which uses a single radar sensor on each side of the vehicle. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

The invention claimed is:

1. A side impact threat assessment system for a vehicle comprising:
    a single radar sensor mounted on each side of the vehicle, each sensor generating a range and range-rate value for a detected target object; and
    a controller coupled to each radar sensor, said controller calculating an estimated target object speed, an angle of the target object line of travel with respect to said respective sensor line of sight, and a shortest distance value from the respective sensor to the target object line of travel and, comparing said shortest distance value and a change in said angle value to respective threshold values.

2. A system according to claim 1 wherein said controller generates a plurality of target object locations to define said target object line of travel.

3. A system according to claim 2 further comprising a safety countermeasure device, said controller activating said safety countermeasure device when said respective threshold values are satisfied.

4. A system according to claim 1 wherein each of said radar sensors is a pulsed Doppler radar sensor having a field of view approximately 60 degrees wide.

5. A system according to claim 3 wherein said safety countermeasure device comprises at least one of a side airbag, a side curtain airbag, and a seat belt pretensioner.

6. A system according to claim 1 wherein said controller is adapted to compare said target object speed to a threshold detected object speed.

7. A system according to claim 6 wherein said controller is adapted to compare said target object range to a threshold detected object range.

8. A system according to claim 7 wherein said controller is adapted to estimate a target object time-to-impact and compare said target object time-to-impact to a threshold detected object time-to-impact.

9. A system according to claim 8 further comprising a safety countermeasure device, said controller activating said safety countermeasure device when each of said respective threshold values are satisfied.

10. A method of determining the collision threat of a target object for a side impact vehicle safety system comprising:
    providing a single radar sensor on each side of a vehicle for generating a range and range-rate value for a respective detected target object;
    calculating an estimated target object speed;
    calculating an angle of the target object line of travel with respect to said respective sensor line of sight;
    calculating a shortest distance value from the respective sensor to the target object line of travel;

comparing said shortest distance value and a change in said angle value to respective threshold values.

11. A method according to claim 10 further comprising generating a plurality of target object locations to define a target object line of travel.

12. A method according to claim 10 further comprising comparing said target object speed to a threshold detected object speed.

13. A method according to claim 10 further comprising comparing said target object range to a threshold detected object range.

14. A method according to claim 10 further comprising estimating a target object time-to-impact and comparing said target object time-to-impact to a threshold detected object time-to-impact.

15. A method according to claim 10 further comprising comparing said range-rate value to said detected object speed value.

16. A method according to claim 10 wherein each of said radar sensors is a pulsed Doppler radar sensor having a field of view approximately 60 degrees wide.

17. A method according to claim 10 wherein said shortest distance threshold value is approximately 0.35 meters.

18. A method of operating a vehicle side impact countermeasure system comprising:

providing a single radar sensor on each side of a vehicle for generating a range and range-rate value for a respective detected target object;

calculating an estimated target object speed;

calculating an angle of the target object line of travel with respect to said respective sensor line of sight;

calculating a shortest distance value from the respective sensor to the target object line of travel;

comparing said shortest distance value and a change in said angle value to respective threshold values;

comparing said target object speed to a threshold detected object speed;

comparing said target object range to a threshold detected object range;

estimating a target object time-to-impact and comparing said target object time-to-impact to a threshold detected object time-to-impact; and activating a safety countermeasure device when said respective threshold values are satisfied.

19. A method according to claim 18 further comprising comparing said range-rate value to said detected object speed value.

20. A method according to claim 18 wherein said shortest distance threshold value is approximately 0.35 meters.

* * * * *